US006185873B1

(12) United States Patent
Saito

(10) Patent No.: US 6,185,873 B1
(45) Date of Patent: Feb. 13, 2001

(54) MOUNTING STRUCTURE AND REGULATOR FOR POWER WINDOW APPARATUS

(75) Inventor: Toshihiro Saito, Toyohashi (JP)

(73) Assignee: ASMO Co. Ltd. (JP)

(*) Notice: Under 35 U.S.C. 154(b), the term of this patent shall be extended for 0 days.

(21) Appl. No.: 09/283,703

(22) Filed: Apr. 1, 1999

(30) Foreign Application Priority Data

Apr. 2, 1998 (JP) ... 10-090054
Mar. 16, 1999 (JP) ... 11-070107

(51) Int. Cl.[7] ... B60J 5/04
(52) U.S. Cl. ... 49/502; 49/348
(58) Field of Search ... 49/502, 351, 352, 49/358, 375, 348

(56) References Cited

U.S. PATENT DOCUMENTS 3,231,301 * 1/1966 Gray ... 49/351
4,151,683 * 5/1979 Narita et al. ... 49/353
4,177,606 * 12/1979 Jeavons et al. ... 49/351
4,770,056 * 9/1988 Becker et al. ... 74/505
5,095,659 * 3/1992 Benoit et al. ... 49/502
5,497,578 * 3/1996 Wautelet et al. ... 49/351
5,581,952 * 12/1996 Kapes et al. ... 49/502
5,907,897 * 6/1999 Hisano ... 49/502

* cited by examiner

*Primary Examiner*—Daniel P. Stodola
*Assistant Examiner*—Curtis A. Cohen
(74) *Attorney, Agent, or Firm*—Knobbe, Martens, Olson & Bear, LLP

(57) ABSTRACT

A mounting structure for a power window apparatus including an outer panel, an inner panel, a regulator, a window glass, a motor, and a seal member. The inner panel is separated from the outer panel by a predetermined distance and has a through bore. The regulator has a movable arm, which is arranged in a space formed between the outer panel and the inner panel. The window glass is fixed to the movable arm. The motor is connected to the regulator to drive the movable arm and open and close the window glass. At least a portion of the motor is arranged in the inner panel. The seal member is arranged between the motor and the inner panel to close the through bore.

11 Claims, 16 Drawing Sheets

MOUNTING STRUCTURE AND REGULATOR FOR POWER WINDOW APPARATUS

BACKGROUND OF THE INVENTION

The present invention relates to a mounting structure and regulator for power window apparatuses incorporated in doors of vehicles.

As shown in FIG. 16, a door of a prior art vehicle incorporates a power window apparatus 51. A left door having a door body 52 and a door trim 53 is illustrated in FIG. 16. The door body 52 includes an outer panel 54, which forms the outer surface of a vehicle body, and an inner panel 55, which is separated from the outer panel 54 by a predetermined distance. A slit 71 through which a window glass moves in and out extends between the upper portion of the panels 54, 55. The inner door trim 53 is fixed to the inner panel 55 and forms part of a passenger compartment. A power window apparatus 51 is arranged between the outer panel 54 and the inner panel 55.

A typical power window apparatus 51 has an X-arm type regulator 56 and a motor 57 for driving the regulator. The regulator 56 includes a base 58, a sector gear 59 pivotally supported by the base 58, and a movable arm 60 connected to the sector gear 59.

The power window apparatus 51 will now be described in detail with reference to FIGS. 17 and 18. A motor 57, which has a main body 61 and an output portion 62, is fixed to the base 58. The output portion 62 has a resin housing 63 and a cover 72 for covering the housing 63. The housing 63 has three mounting bores 63*a*. A metal column 64 is fixed in each mounting bore 63*a*. A through bore 58*a* (FIG. 18) extends through the base 58 in correspondence with each mounting bore 63*a*. A bolt 65 is inserted through the bore 58*a* and screwed into the column 64 to fasten the motor 57 to the base 58.

The main body 61 includes a rotary shaft (not shown), on which a worm (not shown) is provided at the distal end. The worm is meshed with a worm wheel 66, which is rotatably supported in the housing 63 of the output portion 62. The worm wheel 66 is connected to an output shaft 69 by means of a rubber cushion 67 and a steel plate 68. A gear 70, which meshes with the sector gear 59, is fixed to the output shaft 69.

The base 58 has a bearing bore 58*b* formed at a position corresponding to the output shaft 69. The bearing bore 58*b* rotatably supports the distal end of the output shaft 69 when the motor 57 is fixed to the base 58.

As shown in FIG. 16, the power window apparatus 51 is inserted through an opening 55*a*, which is formed in the inner panel 55, and arranged in the space between the outer panel 54 and the inner panel 55. The base 58 is then secured to the inner panel 55. The movable arm 60 of the power window apparatus 51 is fixed to the lower end of the window glass. The lower end of the window glass is inserted through the slit 71, which extends between the outer panel 54 and the inner panel 55, to be fixed to the movable arm 60. The sector gear 59 of the regulator 56 is pivoted when the motor 57 is driven. The pivoting of the sector gear 59 moves the movable arm 60 vertically. The vertical movement of the movable arm opens and closes the window.

However, foreign materials, such as rainwater, sometimes enter the slit 71 between the outer panel 54 and the inner panel 55. In such cases, the power window apparatus 51 is exposed to the rainwater. Accordingly, the motor 57 must be waterproof to be protected from the rainwater. Thus, a Butyl rubber piece is adhered to the portion where the housing 63 and the cover 72 are connected to each other or a waterproof electric circuit (e.g., wires and connectors) is employed to make the motor 57 waterproof. Furthermore, the housing 63 of the main body 61 usually has a ventilation hole to prevent the pressure in the housing 63 from becoming negative. Therefore, a breather pipe is employed to prevent water from entering the ventilation hole. Accordingly, making the motor 57 waterproof increases the production costs of the motor 57 and the power window apparatus 51.

The mounting of a regulator 87 and a drive motor 88 to an inner panel 85 also has a shortcoming. A structure for mounting the regulator 87 and the drive motor 88, which are employed in a right door, will now be described with a reference to FIG. 19.

The proximal end of a spiral spring 95 is fixed to a rotary shaft 91, which is provided on a base 89. The distal end of the spiral spring 95 is hooked to a hooking portion 89*g* to apply an elastic force to an arm 90 in the counterclockwise direction, as viewed in the drawing.

When the motor 88 is secured to the base 89, an output gear 99 meshes with a sector gear 94. An output portion 100 of the motor 88 is decelerated by a worm and a worm gear. Therefore, the motor 88 is not rotated even if the normal elastic force of the spiral spring 95 acts on the output gear 99. However, removal of the motor 88 disengages the output gear 99 from the sector gear 94 and pivots the arm 90 with force. Thus, the removal must be performed with care. In addition, the removal is burdensome since the removal takes place in the space between the inner panel 85 and a door trim 83, which is out of sight. This decreases efficiency during installation of the regulator 87 and the drive motor 88.

SUMMARY OF THE INVENTION

Accordingly, it is a first objective of the present invention to provide a mounting structure and a mounting method of a power window apparatus that decreases production costs related to the waterproof treatment of the motor.

It is second objective of the present invention to provide a window regulator that facilitates installation.

To achieve the above objective, the present invention provides a mounting structure for a power window apparatus including an outer panel, an inner panel having a through bore, wherein the inner panel is separated from the outer panel by a predetermined distance, a regulator having a movable arm arranged in a space formed between the outer panel and the inner panel, a window glass fixed to the movable arm, a motor for driving the movable arm to open and close the window glass, wherein the motor is connected to the regulator, and wherein at least a portion of the motor is arranged in the inner panel, and a seal member for closing the through bore, wherein the seal member is arranged between the motor and the inner panel.

A vehicle door according to the present invention includes an outer panel defining the outer surface of a body, an inner panel separated from the outer panel by a predetermined distance, and a power window apparatus having a motor, wherein the inner panel has an accommodating recess defined at its inner side to accommodate the motor.

A method for mounting a power window apparatus according to the present invention includes the steps of securing an inner panel, which has a through bore and a mounting bore, to an outer panel, fixing a weld bolt by welding the weld bolt to the regulator at a position corresponding to the mounting bore, arranging the regulator in a space formed between the outer panel and the inner panel, and connecting the motor to the weld bolt to fix the motor and the regulator to the inner panel.

A window regulator according to the present invention includes a base attached to the inner panel, a drive motor attached to the base by means of the inner panel, the drive motor having a drive shaft, an arm having a sector gear, which is meshed with the drive shaft of the drive motor, wherein the arm is supported relatively pivotal to the base, an urging member for urging the arm in a single direction relative to the base, wherein the urging member is arranged at the connecting portion between the base and the arm, and an engaging member for restricting pivoting of the arm relative to the base by engaging the base and the arm, wherein part of the drive motor releases the engagement between the base and the arm, which is caused by the engaging member, when the drive motor is attached to the base.

A method for installing a window regulator according to the present invention includes the steps of engaging the base and the arm to each other with the engaging member, fixing the base to the inner panel such that pivoting of the arm relative to the base is restricted, and attaching the drive motor to the base to release the engagement between the base and the arm, which is caused by the engaging member, with part of the drive motor.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2(*b*) is a perspective view showing a motor of the power window apparatus of FIG. 1;

DETAILED DESCRIPTION OF THE PREFERRED EMBODIMENTS (First Embodiment)

A power window apparatus according to an embodiment of the present invention will now be described with reference to the drawings.

Figure 1:
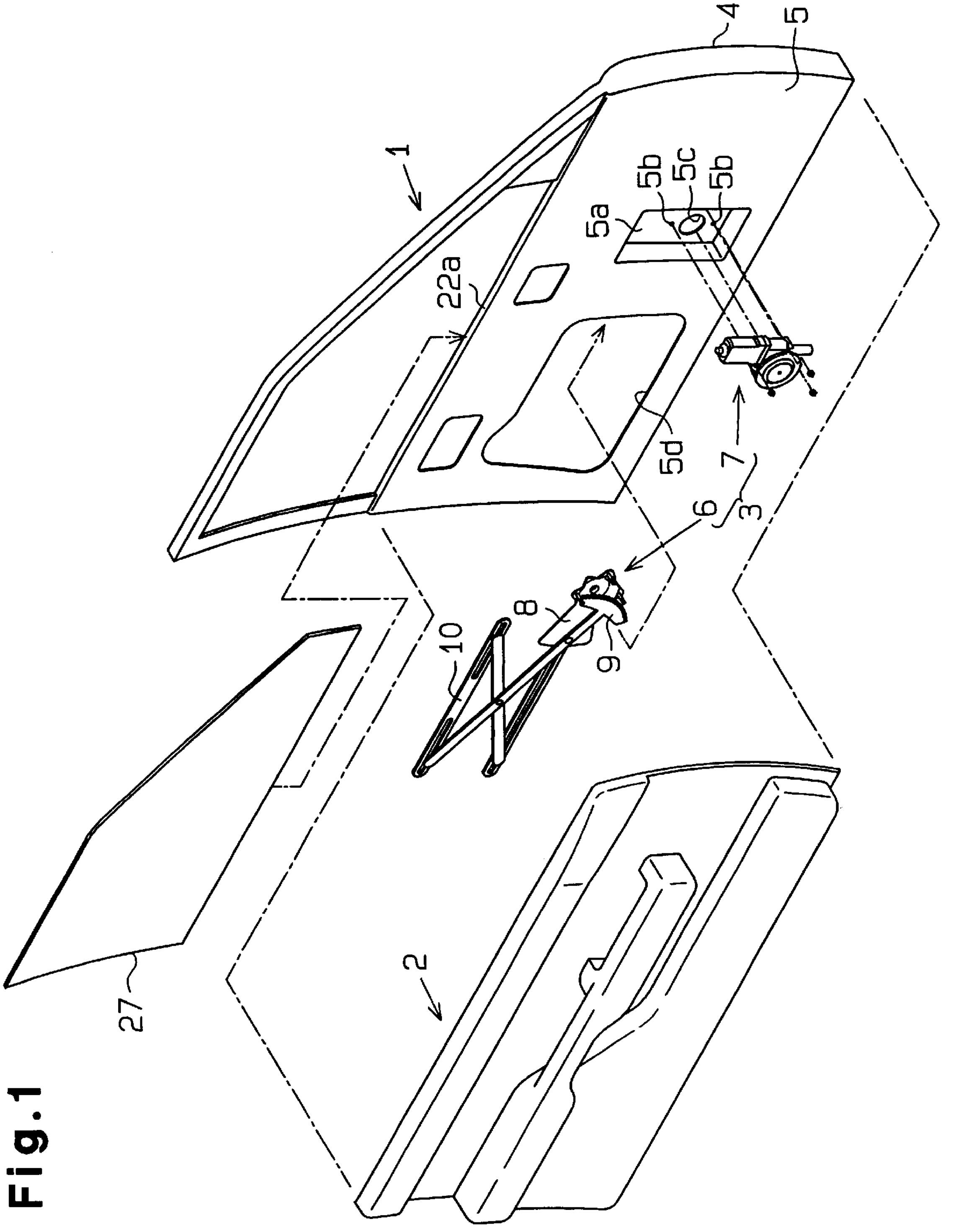
FIG. 1 is a perspective view showing a vehicle door that incorporates a power window apparatus according to a first embodiment of the present invention.

As shown in FIG. 1, a vehicle door has a door body 1, a door trim 2, and a power window apparatus 3. The door body 1 includes an outer panel 4, which forms the outer surface of a vehicle body, and an inner panel 5, which is separated from the outer panel 4 by a predetermined distance. The door trim 2 is secured to the inner panel 5 and forms part of a passenger compartment.

The power window apparatus 3 has an X-arm type regulator 6 and a motor 7 for driving the regulator 6. The regulator 6 includes a base 8, a sector gear 9 pivotally supported by the base 8, and a movable arm 10 connected to the sector gear 9. Pivoting of the sector gear 9 moves the movable arm 10 vertically.

Figure 2A:
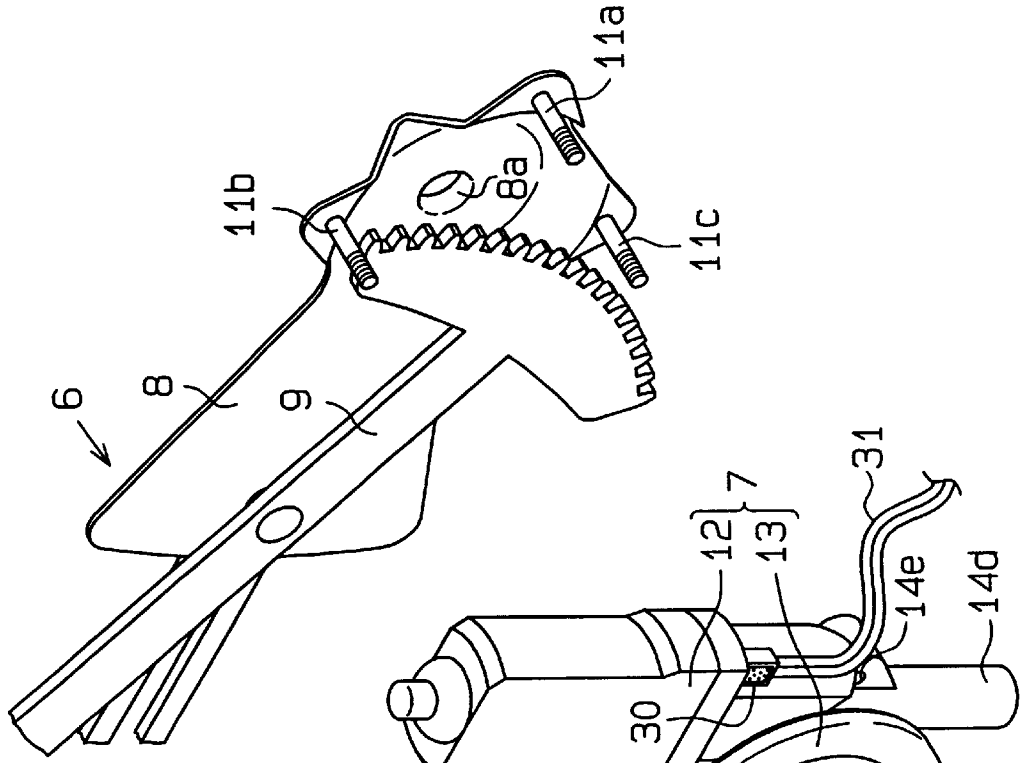
FIG. 2(*a*) is a perspective view showing a regulator of the power window apparatus of FIG. 1.
Figure 2B:
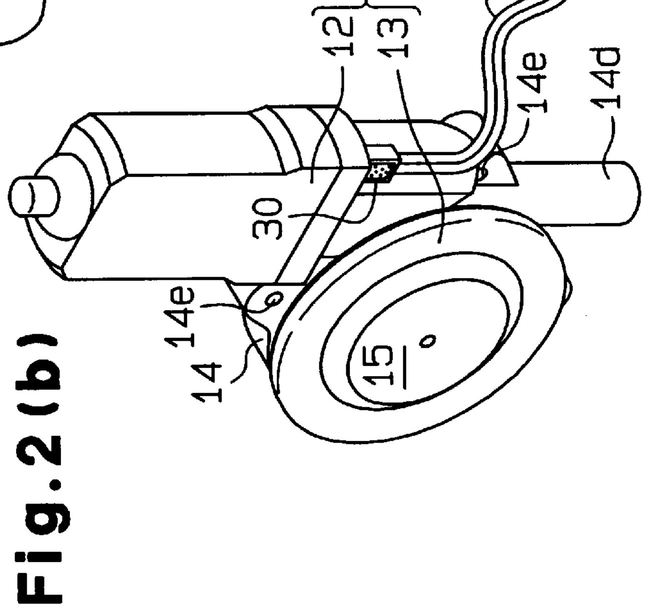
Figure 3:
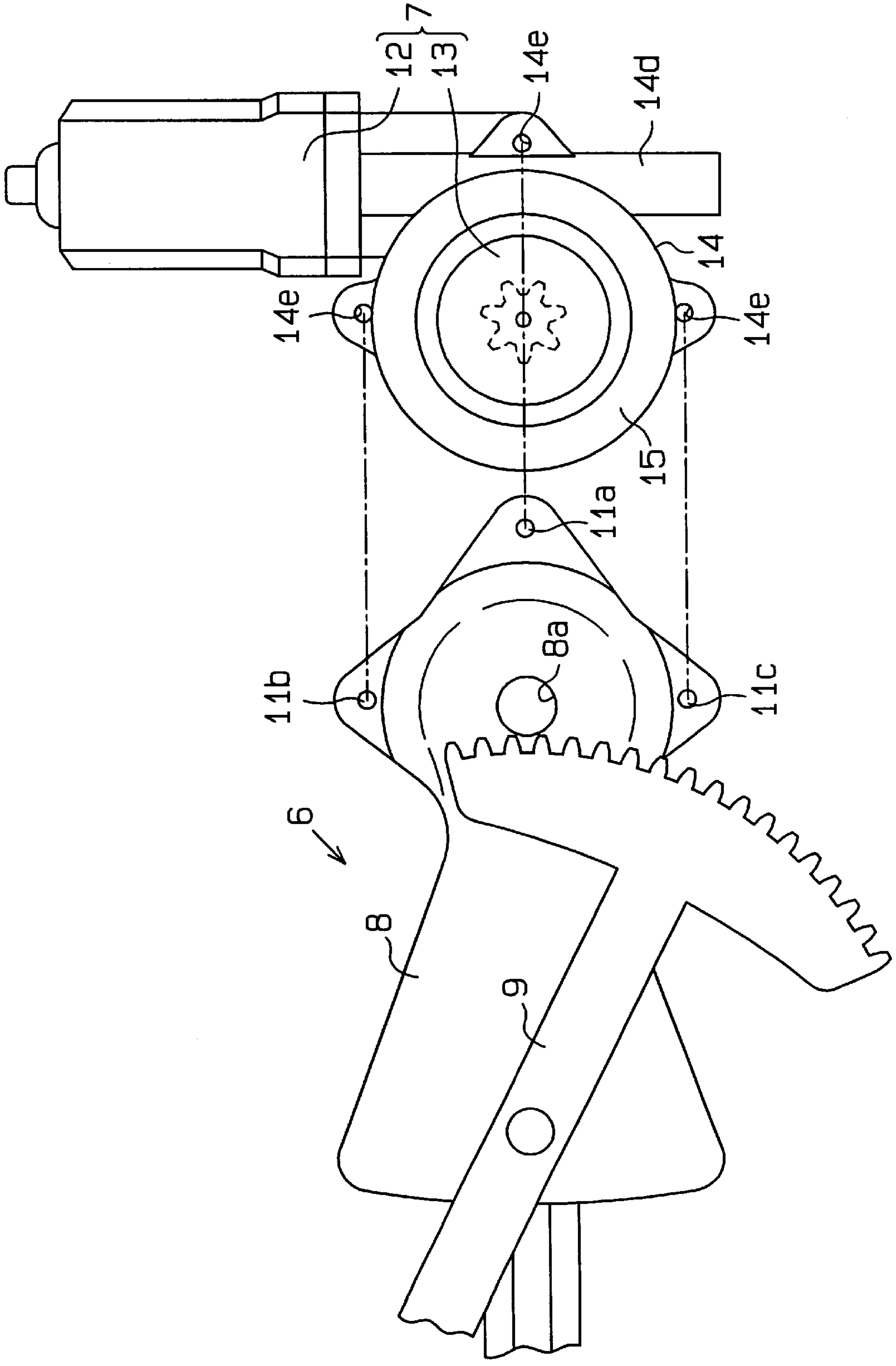
FIG. 3 is a side view showing the power window apparatus of FIG. 1.

With reference to FIGS. 2(*a*), 2(*b*), and 3, three weld bolts 11*a*–11*c* are welded and fixed to the base 8 of the regulator 6. The motor 7 has a main body 12 and an output portion 13. The main body 12 has a power feeding portion 30 for supplying the motor 7 with electric power. A wire 31 is connected to the power feeding portion 30. Hot metal, which contains resin material, is charged into the portion where the power feeding portion 30 and the wire 31 are connected to each other. Alternatively, the connecting portion may be sealed by a grommet. The output portion 13 includes a housing 14 and a cover 15, which covers the housing 14. Three mounting bores 14*e* extend through the housing 14 at positions corresponding to the weld bolts 11*a*–11*c*.

Figure 5:
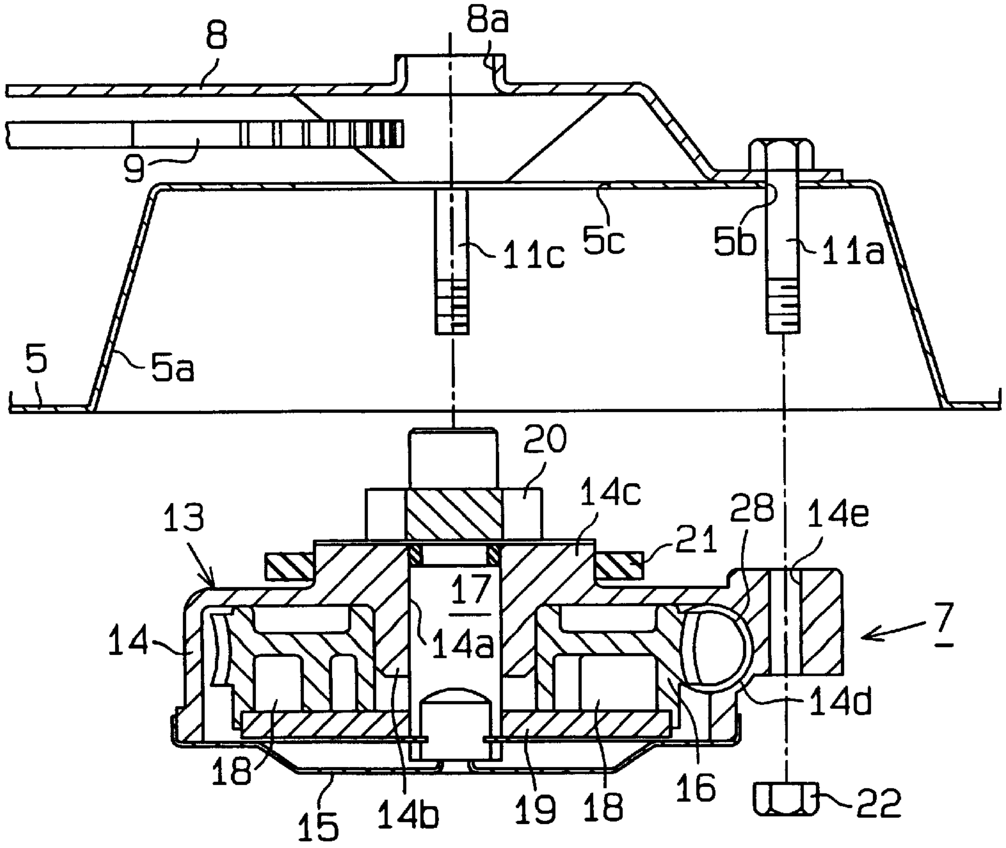
FIG. 5 is a cross-sectional view showing a structure for mounting the power window apparatus of FIG. 1 to the inner panel.

As shown in FIG. 5, the housing 14 of the output portion 13 is cup-like. A bearing wall 14*b* extends inward from the center of the closed portion, while a projecting portion 14*c* extends outward from the center of the closed portion. The bearing wall 14*b* defines a shaft bore 14*a*. An output shaft 17 is supported by the bearing wall 14*b*. The output shaft 17 has a gear 20 where the projecting portion 14*c* projects from the housing 14. A generally cylindrical worm case portion 14*d*, which extends continuously from the main body 12, is defined in the tubular portion of the housing 14.

The main body 12 has a rotary shaft (not shown), which is accommodated in the worm case 14*d*. The rotary shaft has a worm 28 A worm wheel 16 is rotatably supported about the bearing wall 14*b*. The worm wheel 16 meshes with the worm 28 of the rotary shaft. The worm wheel 16 and the output shaft 17 are connected to each other by a rubber cushion 18 and a steel plate 19. Rotation of the rotary shaft of the main body 12 rotates the worm wheel 16 and transmits torque to the output shaft 17 through the rubber cushion 18 and the steel plate 19. This rotates the output shaft 17 and the gear 20.

An elastic member 21 (i.e., seal member) is arranged about the axially intermediate portion of the projecting portion 14*c*. The elastic member 21 is annular and preferably made of an independent foam body. When the motor 7 is fastened to the inner panel 5, the elastic member 21 closes a through hole 5*c* to separate the inner and outer sides of the inner panel 5 from each other. The elastic member 21 may be replaced by other members or arranged at other locations as long as the through hole 5*c* can be closed.

A bearing bore 8*a* is defined in the base 8 of the regulator 6 at a position corresponding to the output shaft 17.

The inner panel 5 has a recessed portion 5*a* to accommodate the motor 7. The recessed portion 5*a* opens toward the passenger compartment of the vehicle. Three mounting bores 5*b* are provided in the recessed portion 5*a* at positions corresponding to the weld bolts 11*a*–11*c* of the base 8. Furthermore, the recessed portion 5*a* includes the through hole 5*c*, which is located at a position corresponding to the projecting portion 14*c* of the housing 14. The diameter of the through hole 5*c* is larger than the outer diameter of the projecting portion 14*c* and smaller than the diameter of the elastic member 21. The inner panel 5 also has an opening 5*d* (FIG. 1) so that the regulator 5 can be inserted into the space between the outer panel 4 and the inner panel 5.

The procedures for installing the power window apparatus 3 (the regulator 6 and the motor 7) in the vehicle door will now be described.

The regulator 6 is first inserted through the opening 5*d* (FIG. 1) and arranged between the outer panel 4 and the inner panel 5. The weld bolts 11*a*–11*c* of the regulator 6 are then fitted into the mounting bores 5*b* of the inner panel 5 such that the distal ends of the weld bolts 11*a*–11*c* project inward (toward the passenger compartment) in the recessed portion 5*a* of the inner panel 5.

Figure 4:
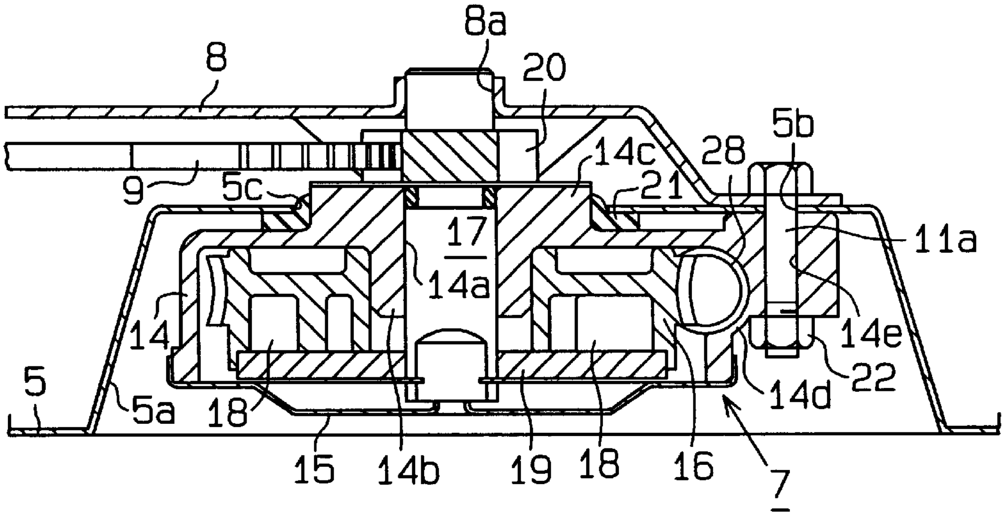
FIG. 4 is a cross-sectional view showing a structure for mounting the power window apparatus of FIG. 1 to an inner panel.

As shown in FIG. 4, the weld bolts 11*a*–11*c* (11*b*, 11*c* are not shown) are each inserted into the corresponding mounting bores 14*e* of the motor 7. The distal end of the output shaft 17 is fitted into the bearing bore 8*a* of the base 8 such that the gear 20 meshes with the teeth of the sector gear 9. The distal end of each weld bolt 11*a*–11*c* is then fastened by a nut 22 to secure the regulator 6 and the motor 7 to the inner panel 5.

The projecting portion 14*c* of the housing 14 projects out of the through hole 5*c* of the inner panel 5 toward the outer panel 4. The through hole 5*c* is sealed by the elastic member 21. More specifically, the periphery (rim) of the elastic member 21 contacts the inner panel 5 and flexes toward the tubular portion of the housing 14. Furthermore, the elastic member 21 is held and compressed between the inner panel 5 and the housing 14 so as to adhere to the inner panel 5 and the housing 14. Thus, the elastic member 21 seals the through hole 5*c*.

Afterwards, the lower end of a window glass 27 (FIG. 1) is attached to the movable arm 10 of the power window apparatus 3. More specifically, the lower end of the window glass 27 is inserted through a slit 22*a*, which extends between the outer panel 4 and the inner panel 5 and fixed to the movable arm 10. The door trim 2 is then secured to the inner side (passenger compartment side) of the inner panel 5.

The motor 7 is driven in the vehicle door to pivot the sector gear 9 of the regulator 6 and vertically move the movable arm 10. This opens and closes the window glass 27 (FIG. 1).

The power window apparatus 3 of this embodiment has the characteristics described below.

In this embodiment, the elastic member 21 is provided about the projecting portion 14*c*. Thus, when the motor 7 is secured to the inner panel 5, the through hole 5*c* of the inner panel 5 is securely closed and sealed. Accordingly, part of the motor 7 (the portion located in the inner panel 5) is never exposed to rainwater even if rainwater enters through the slit 22*a* of the door. The employment of only one elastic member 21 reduces the number of locations that need to be waterproofed. For example, a Butyl rubber piece need not be adhered to the portion where the housing 14 and the cover 15 are connected to each other. Furthermore, a waterproof electric system (e.g., wires and connectors) need not be employed. Additionally, rainwater does not enter the housing 14 even if ventilation holes (not shown) are provided to prevent the pressure in the main body 12 from becoming negative. In other words, a breather pipe is unnecessary to prevent the entrance of rainwater. The costs of the motor 7 and the power window apparatus 3 are thus reduced.

The elastic member 21 is made of an independent foam body and fixed about the axially intermediate portion of the projecting portion 14*c*. Therefore, the elastic member 21 flexes easily and eliminates the requirement for high accuracy when assembling the motor 7 to the inner panel 7. In other words, the elastic member 21 facilitates installation of the motor 7 and guarantees the sealing of the through hole 5*c*.

In this embodiment, the motor 7 and the regulator 6 are fixed to the inner panel 5 on opposite sides of the inner panel 5. The same weld bolts 11*a*–11*c* are employed to assemble the power window apparatus 3 and fix the power window apparatus 3 to the inner panel 5. Accordingly, the process for coupling the regulator 6 and the motor 7 to each other and the process for securing the power window apparatus 3 to the inner panel 5 is carried out simultaneously. This reduces the production costs of the power window apparatus 3 and the vehicle door.

In this embodiment, the regulator 6 and the motor 7 are fastened to the inner panel 5 by the weld bolts 11*a*–11*c* and the nuts 22. This facilitates the installation of the inner panel 6 and the motor 7, since the inner panel 6 and the motor 7 are secured to each other simply by fastening nuts 22 from the passenger compartment side of the inner panel 7.

Further, metal columns need not be provided in the mounting bores 14*e*.

In this embodiment, the motor 7 is accommodated in the recessed portion 5*a* of the inner panel 5. Accordingly, the motor 7 does not extend into the passenger compartment, thus the space available for the passenger compartment is not reduced.

(Second Embodiment)

Figure 6:
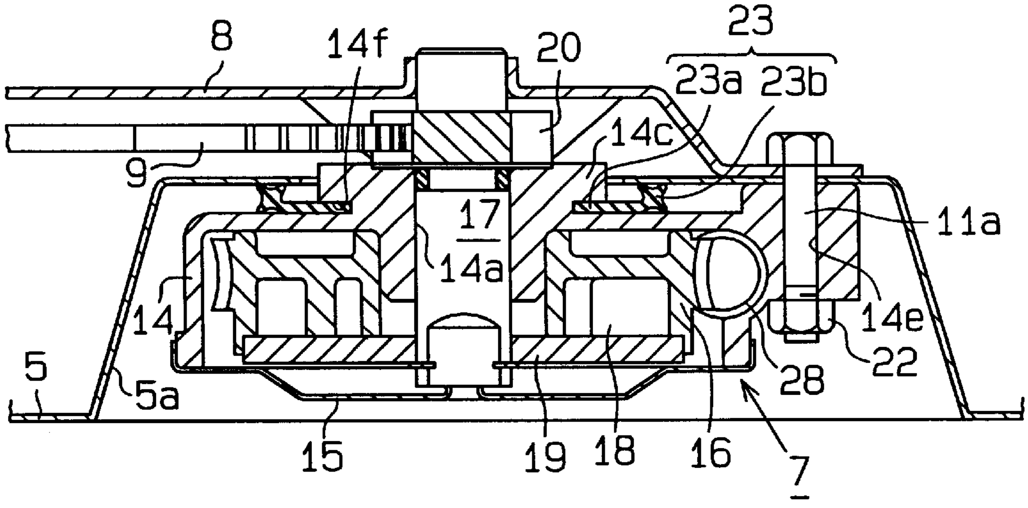
FIG. 6 is a cross-sectional view showing a power window apparatus according to a second embodiment of the present invention.

A power window apparatus according to a second embodiment of the present invention will now be described with reference to FIG. 6. In the second embodiment, the elastic member 21 of the first embodiment is replaced by a rubber partition 23.

An annular recess 14*f* extends along the proximal portion of the projecting portion 14*c* of the housing 14. The rubber partition 23 is fixed in the recess 14*f*. More specifically, the rubber partition 23 is a flexible rubber ring that includes an annular disc portion 23*a* and an X-shaped sealing portion 23*b*, which extends along the periphery of the disc portion 23*a*. The sealing portion 23*b* has an X-shaped cross-section. The disc portion 23*a* is fitted into the recess 14*f* to secure the rubber partition 23.

When the motor 7 is fixed to the inner panel 5, the sealing portion 23*b* of the rubber partition 23 is held between the inner panel 5 and the housing 14 thereby sealing the through hole 5c. The rubber partition 23 is compressed to adhere to the inner panel 5 and the housing 14. Accordingly, the rubber partition 23 closes the through hole 5c and seals the motor 7.

(Third Embodiment)

Figure 7:
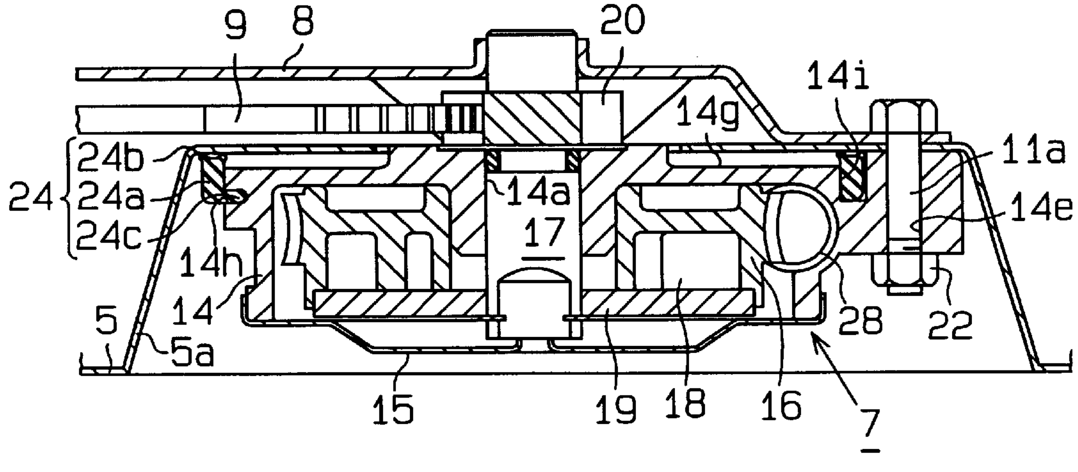
FIG. 7 is a cross-sectional view showing a power window apparatus according to a third embodiment of the present invention.

As shown in FIG. 7, in a power window apparatus according to a third embodiment of the present invention, a rubber partition 24, which is shaped differently from the rubber partition 23 of the second embodiment, is employed.

A recess 14h is provided on the peripheral surface of the housing 14. A further recess 14i is provided on an inner panel mounting surface 14g of the housing 14 where the mounting bores 14e are formed. Thus, an annular peripheral surface extends along the inner surface of the recess 14i and along the outer surface where no mounting bores 14e are formed.

The rubber partition 24 is fixed to the annular peripheral surface. More specifically, the rubber partition 23 has a tubular portion 24a, a sealing portion 24b, which is defined at the top end of the tubular portion 24a, as viewed in FIG. 7, and a projection 24c, which is defined at the lower end of the tubular portion 24a, as viewed in FIG. 7. The sealing portion 24b has a Y-shaped cross-section. The projection 24c extends along the inner side of the tubular portion 24a at a location corresponding to the recess 14h. The projection 24c is fitted into the recess 14h to secure the rubber partition 24.

When the motor 7 is fixed to the inner panel 5, the sealing portion 24b of the rubber partition 24 flexes as it abuts against the inner panel 5. The rubber partition 24 is held between the inner panel 5 and the housing 14 to adhere to the inner panel 5 and close the through hole 5c.

Accordingly, the closing of the through hole 5c is guaranteed. The rubber partition 24 is not located between the mounting surface 14g of the housing 14 and the mounting surface of the inner panel 5. This decreases the thickness of the motor 7.

(Fourth Embodiment)

Figure 8:
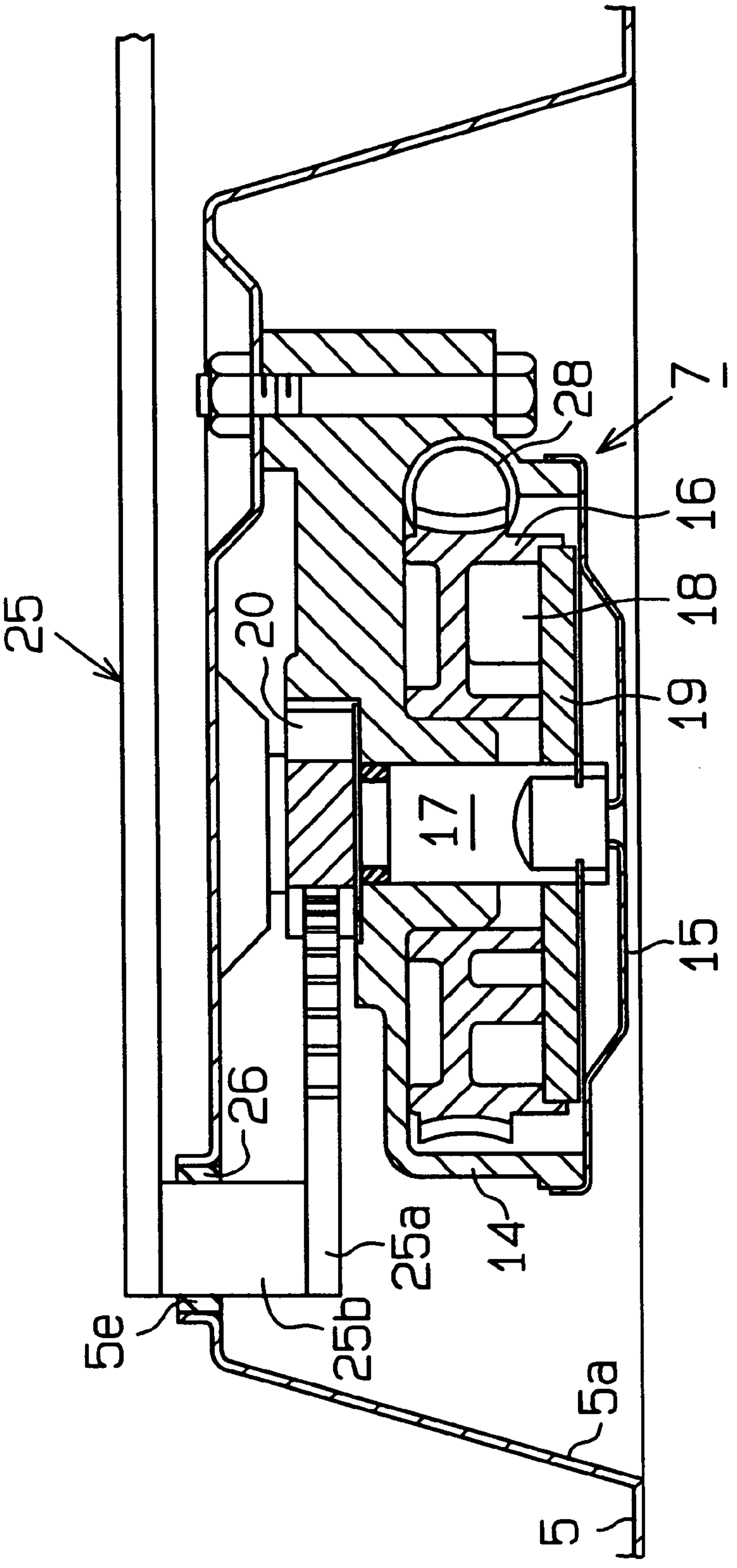
FIG. 8 is a cross-sectional view showing a power window apparatus according to a fourth embodiment of the present invention.

As shown in FIG. 8, in a power window apparatus according to a fourth embodiment of the present invention, a sector gear 25a of a regulator 25 is arranged at the inner side (passenger compartment side) of the inner panel 5. A shaft 25b of the sector gear 25a is rotatably supported in a through hole 5e of the inner panel 5. A movable arm (not shown) of the regulator 25, which is arranged between the outer panel 4 and the inner panel 5, is connected to the shaft 25b. The movable arm of the regulator 25 is driven by the torque of the shaft 25b. The teeth of the sector gear 25a mesh with the gear 20 of the motor 7, which is secured to the inner side (passenger compartment side) of the inner panel 5. The shaft 25b of the sector gear 25a is supported by a bearing 26 in the through hole 5e. The bearing 26 also functions as a seal for preventing liquid from entering the inner side of the inner panel 5. Thus, the through hole 5e is easily closed by the bearing 26. Accordingly, the entire motor 7 is never exposed to rainwater even if rainwater enters the space between the outer panel 4 and the inner panel 5 through the slit 22a of the door.

(Fifth Embodiment)

A power window apparatus according to a fifth embodiment of the present invention will now be described with reference to FIGS. 9 to 11. The power window apparatus is easily installed in vehicle doors.

Figure 9:
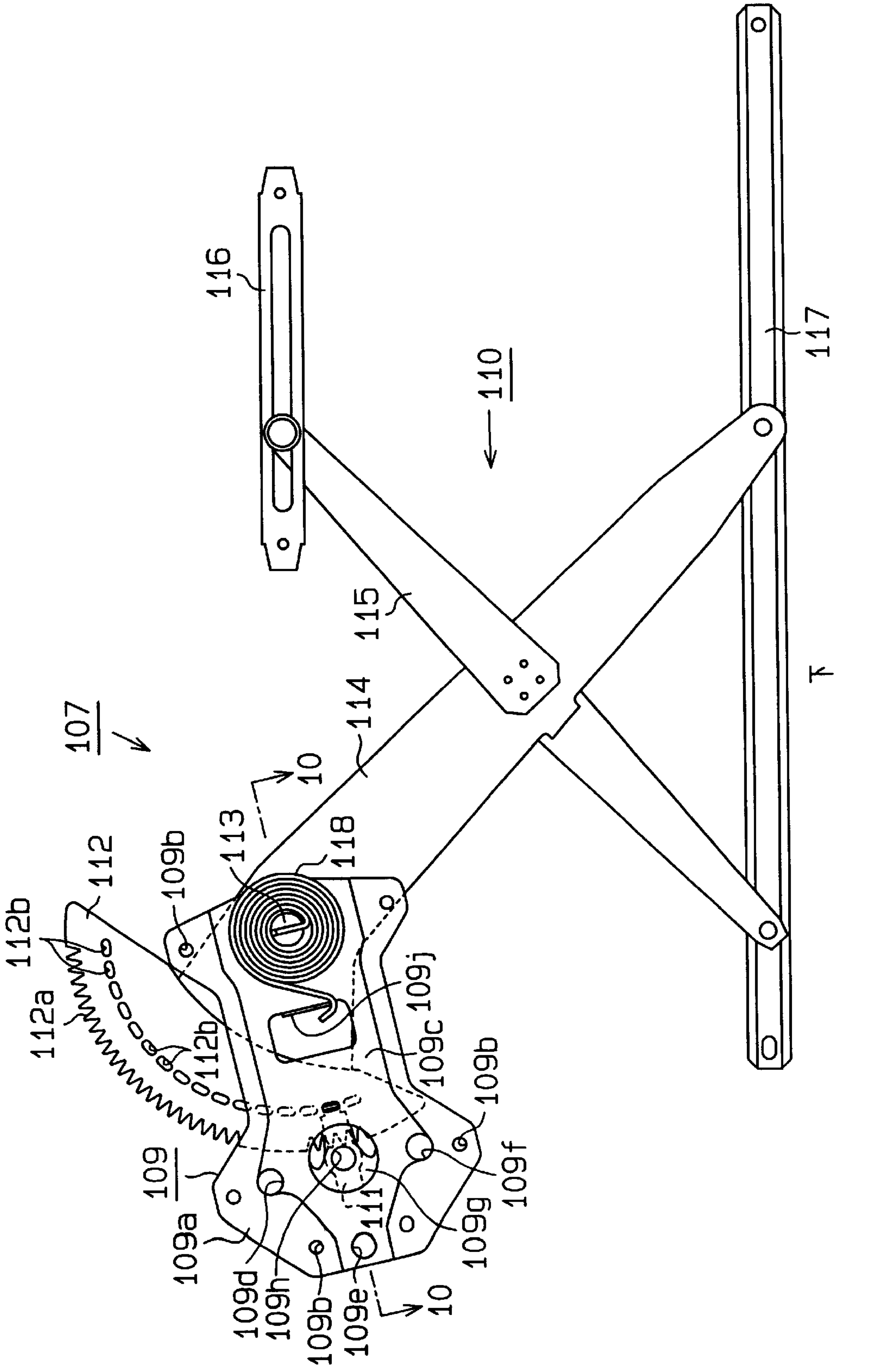
FIG. 9 is a cross-sectional view showing a window regulator according to a fifth embodiment of the present invention.

FIG. 9 shows a regulator 107 employed in a right door of a vehicle. FIG. 10 is a cross-sectional view taken along line 10—10 in FIG. 9. As shown in FIG. 9, the regulator 107 has a plate-like base 109, and an arm portion 110, which is connected to the base 109.

The base 109 has a rim portion 109a and a recessed portion 109c defined in the rim portion 109a. The rim portion 109 has a plurality of mounting bores 109b for securing the base 109 to the inner panel 105. The recessed portion 109c has first, second, and third motor mounting bores 109d, 109e, 109f. A bearing 109g, which projects toward an outer panel 104 (FIG. 10) is formed on the recessed portion 109c between the first to third motor mounting bores 109d–109f.

Figure 10:
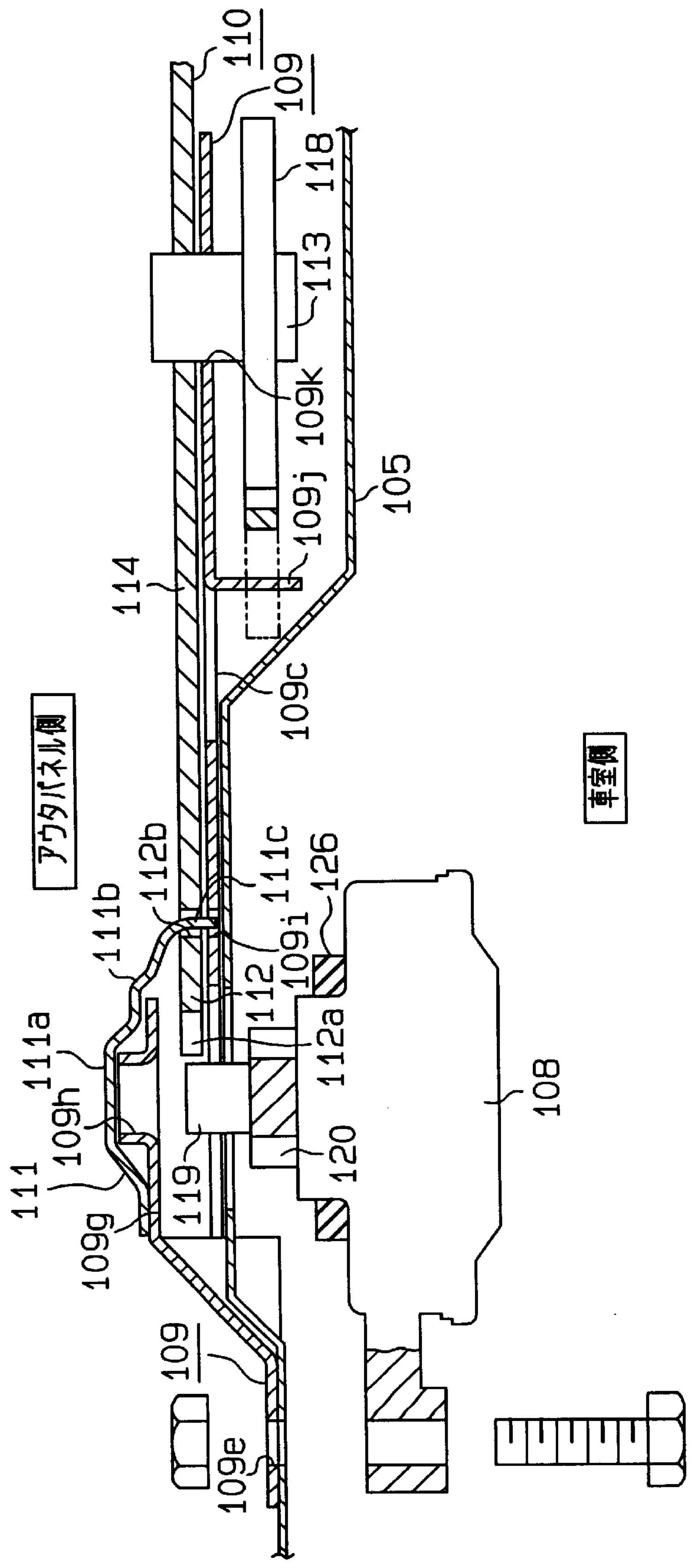
FIG. 10 is a cross-sectional view taken along line 10—10 in FIG. 9.
Figure 11:
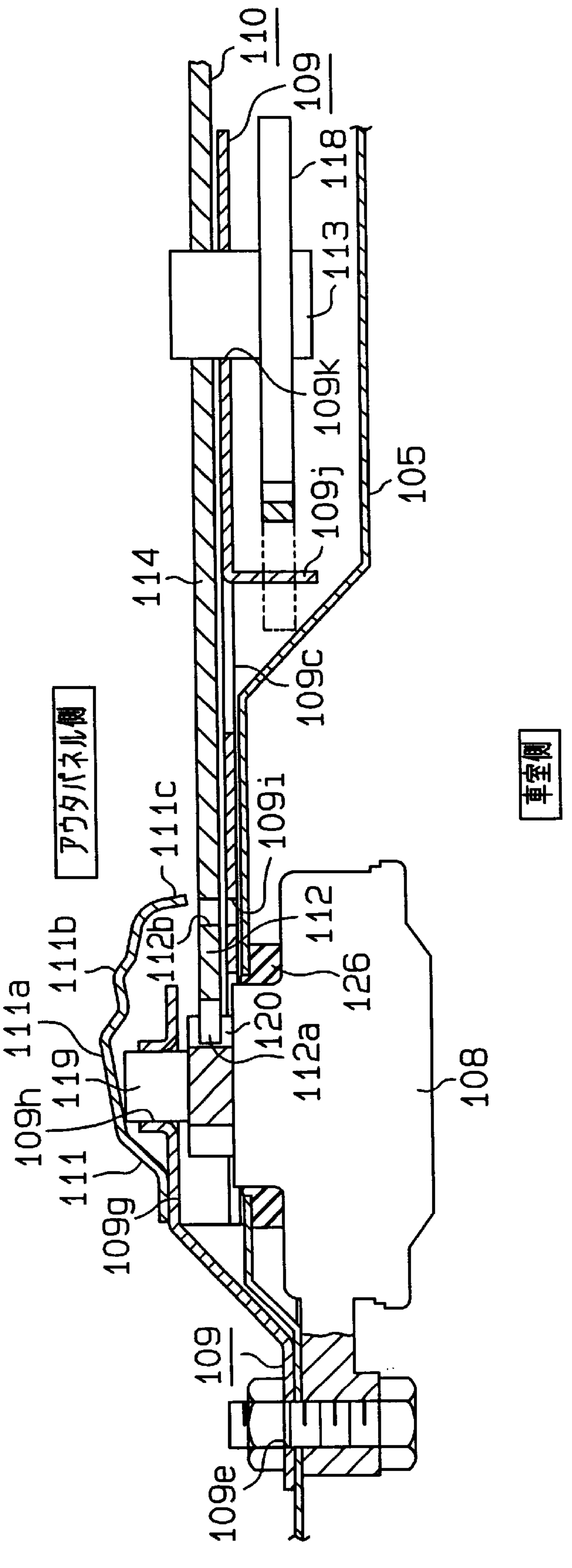
FIG. 11 is a cross-sectional view showing the window regulator with a drive motor fixed thereto.

An opening is provided on the right side of the bearing portion 109g, as viewed in FIG. 10. A drive shaft hole 109h extends through the central portion of the bearing portion 109b. An engaging member 111 covering the drive shaft hole 109h is arranged on the bearing 109b at the surface that is closer to the outer panel 104. The engaging member 111 has a proximal portion, which is fixed to the left side of the drive shaft hole 109h. The engaging member 111, which is preferably a leaf spring, further has a central portion that defines a cover portion 111a, a bent portion 111b extending toward the inner panel 105 from the cover portion 111a, and a distal end that defines a hook 111c.

The cover portion 111a is arranged near the drive shaft hole 109h to cover the outer panel side opening of the drive shaft hole 109h. The hook 111c extends to a location where the hook 11c engages a first engaging bore 109i, which is defined in the recessed portion 109c of the base 109.

As shown in FIG. 9, a rib 109j is arranged near the middle of the recessed portion 109c. The rib 109j is formed by cutting out the recessed portion 109c and bending the cut-out portion toward the inner panel 105. Furthermore, a pivot shaft hole 109k (FIG. 10) extends through the base 109 at the right side of the rib 109j. The arm portion 110 is pivotally supported in the shaft hole 109k.

The arm portion 110 has a first arm 114, a second arm 115, and a sector gear 112. The first and second arms 114, 115 intersect each other at their middle portions in an X-shaped manner and are pivotal relative to each other. The first and second arms 114, 115 are connected to a fixed arm 116, which is fixed to the inner panel 105, and a movable arm 117, which is lifted and lowered relative to the fixed arm 116. The second arm 115 has a first end slidably supported by the fixed arm 116 and a second end slidably supported by the movable arm 117. The first arm 114 has a first end slidably supported by the movable arm 117 and a second portion pivotally connected to the base 109 by means of a pivot shaft 113. The movable arm 117 is fixed to the lower end of the window glass 27 (FIG. 1).

As shown in FIG. 10, the pivot shaft 113 is inserted through the pivot shaft hole 109k of the base 109 from the side of the outer panel 104 and supported pivotally relative to the pivot shaft hole 109k. The distal end of the pivot shaft 113 extends into the recessed portion 109c of the base 109 and is secured to the proximal portion of a spiral spring (i.e., urging member) 118. The distal end of the spiral spring 118 is engaged with the rib 109j. Accordingly, an elastic force is applied to the first arm 114 in a counterclockwise direction, as viewed in FIG. 9, when the base 109 is fixed to the inner panel 105.

A sector gear 112 is formed on the first arm 114. The sector gear 112 has an arcuate periphery. Teeth 112a are formed on the periphery. As shown in FIG. 10, the teeth 112a of the sector gear 112 are arranged in the opened side of the bearing 109g. As shown in FIGS. 9 and 10, a plurality of second engaging bores 112b (16 in this embodiment) are formed on the inner side of the teeth 112a of the sector gear 112. The number of the second engaging bores 112b may be changed arbitrarily. The second engaging bores 112b are through bores, which are equally spaced from one another in an arcuate manner about the pivot shaft 113. The first engaging bore 109*i* is located on the base 109 along an arc connecting the second engaging bores 112*b*.

Pivoting of the first arm 114 relative to the base 109 aligns each of the second engaging bores 112*b* with the first engaging bore 109*i*. When one of the second engaging bores 112*b* is aligned with the first engaging bore 109*i*, the hook 111*c* of the engaging member 111 is inserted through the second engaging bore 112*b* and engaged with the first engaging bore 109*i*. This restricts relative pivoting between the base 109 and the first arm 114, as shown in FIG. 10.

As shown in FIG. 10, a drive motor 108 is arranged in the passenger compartment side of the inner panel 105 in a manner clamping the inner panel 105. An elastic member 126 similar to that employed in the first embodiment is arranged on a boss projecting from the drive motor 108. The elastic member 126 produces the sealing effects produced in the first embodiment. The drive motor 108 is fixed to the base 109 by fastening bolts to the first to third mounting bores 109*d*–109*f* The drive motor 108 has a drive shaft 119, which is rotatably supported in the drive shaft hole 109*h*. A drive gear 120 is fixed to the drive shaft 119.

When the drive shaft 119 is supported in the drive shaft hole 109*h*, the drive gear 120 is meshed with the teeth 112*a* of the gear 112. In this state, the distal end of the drive shaft 119 forces the cover portion 111*a* of the engaging member 111 toward the outer panel 104. This moves the hook 111*c* of the engaging member 111 out of the first and second engaging bores 109*i*, 112*b* and toward the outer panel 104.

Accordingly, the base 109 and the first arm 114 (sector gear 112) are fixed to the inner panel 105 such that relative pivoting between the base 109 and the first arm 114 is restricted. When the drive motor 108 is fixed to the inner panel 105, the hook 111*c* is moved out of the first and second engaging bores 109*i*, 112*b*. This permits pivoting of the first arm 114 relative to the base 109.

When the drive motor 108 is driven, the arm portion 110 pivots about the pivot shaft 113. The movable arm 117 is lifted and lowered by the pivoting of the arm 110. This opens and closes the window glass 27 (FIG. 1).

If the drive motor 108 is detached from the inner panel 105 for maintenance or other reasons, the elasticity of the engaging member 111 moves the engaging member 111 back toward the inner panel 105. As a result, the hook 111*c* of the engaging member 111 is inserted through the corresponding second bore 112*b* and engaged with the first engaging bore 109*i*. This restricts relative pivoting of the first arm 114 relative to the base 109.

The window regulator 106 of this embodiment has the advantages described below.

The base 109 and the first arm 114 are coupled to the inner panel 105 with the engaging member 111, which restricts relative pivoting between the base 109 and the first arm 114. When the drive motor 108 is secured to the base 109 by means of the inner panel 105, the distal end of the drive shaft 119 is pressed against the cover 111*a* of the engaging member 111. This removes the hook 111*c* of the engaging member 111 from the first and second engaging bores 109*i*, 112*b* and permits pivoting of the base 109 relative to the first arm 114. Accordingly, installation of the window regulator 106 is facilitated.

The relative positions of the base 109 and the first arm 114 are selected as required by engaging the leaf spring hook 111*c* with one of the second engaging bores 112*b*. When removing the window regulator 106, the drive motor 108 is first removed. This causes the hook 111*c* to be re-inserted through the corresponding second engaging bore 112*b* and the first engaging bore 109*i*. Therefore, the hook 111*c* is engaged with one of the second engaging bores 112*b* even if the relative positions of the base 109 and the first arm 114 are not determined. Accordingly, installation and removal procedures are carried out more efficiently.

The distal end of the drive shaft 119 of the drive motor 108 abuts against the cover 111*a* of the engaging portion 111*a*. Grease, which is applied to the distal surface of the drive shaft 119, is thus prevented from leaking out of the cover 111*a*. Therefore, grease does not adhere to other components.

(Sixth Embodiment)

Figure 12:
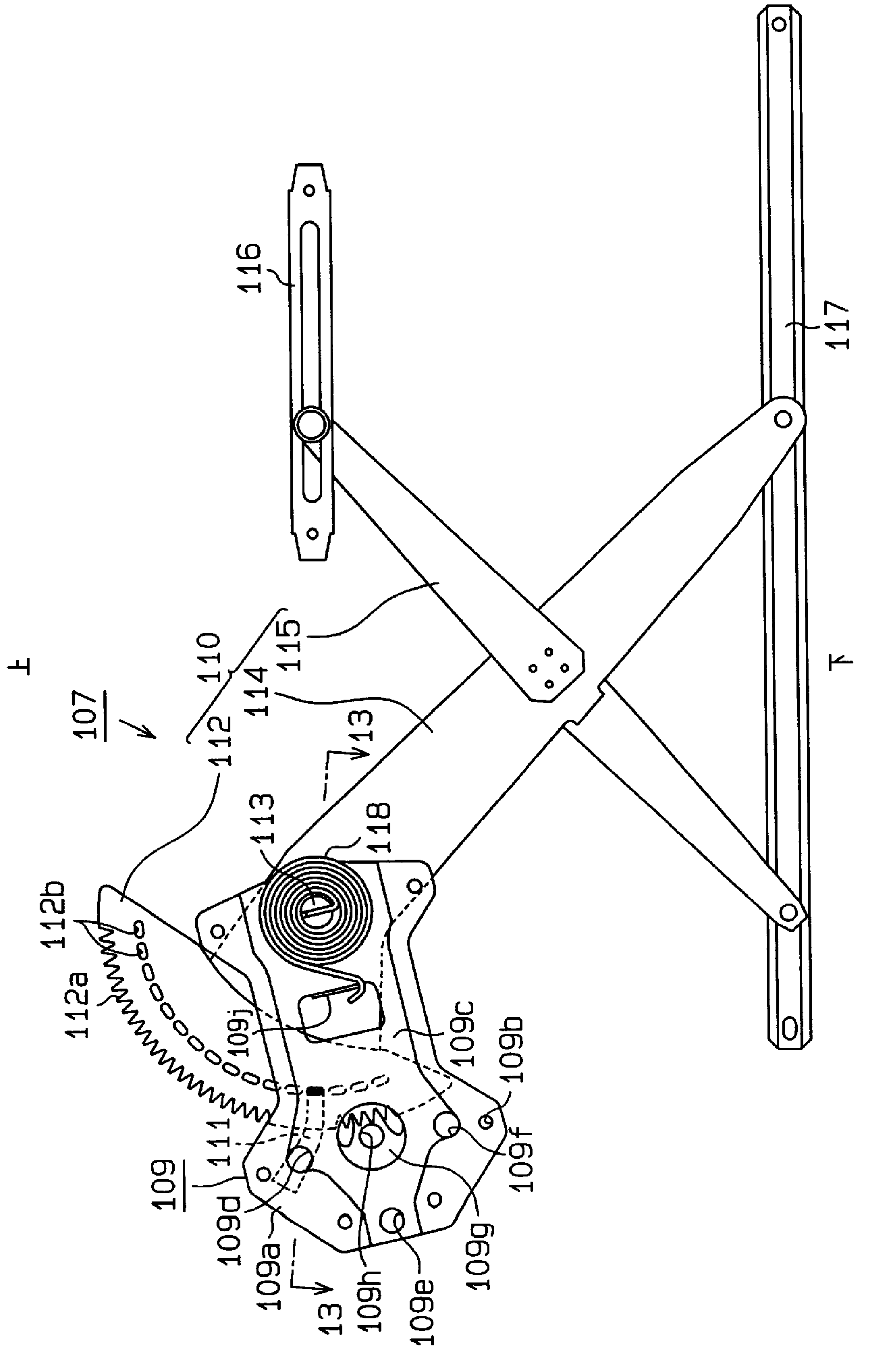
FIG. 12 is a cross-sectional view showing a window regulator according to a sixth embodiment of the present invention.

A power window apparatus according to a sixth embodiment of the present invention will now be described with reference to FIGS. 12 to 14. Description will center on parts differing from the fifth embodiment. As shown in FIG. 12, the engaging member 111 of the sixth embodiment is located at a position higher than that of the fifth embodiment. The engaging member 111 is arranged at a position aligned with the first motor mounting bore 109*d*.

Figure 13:
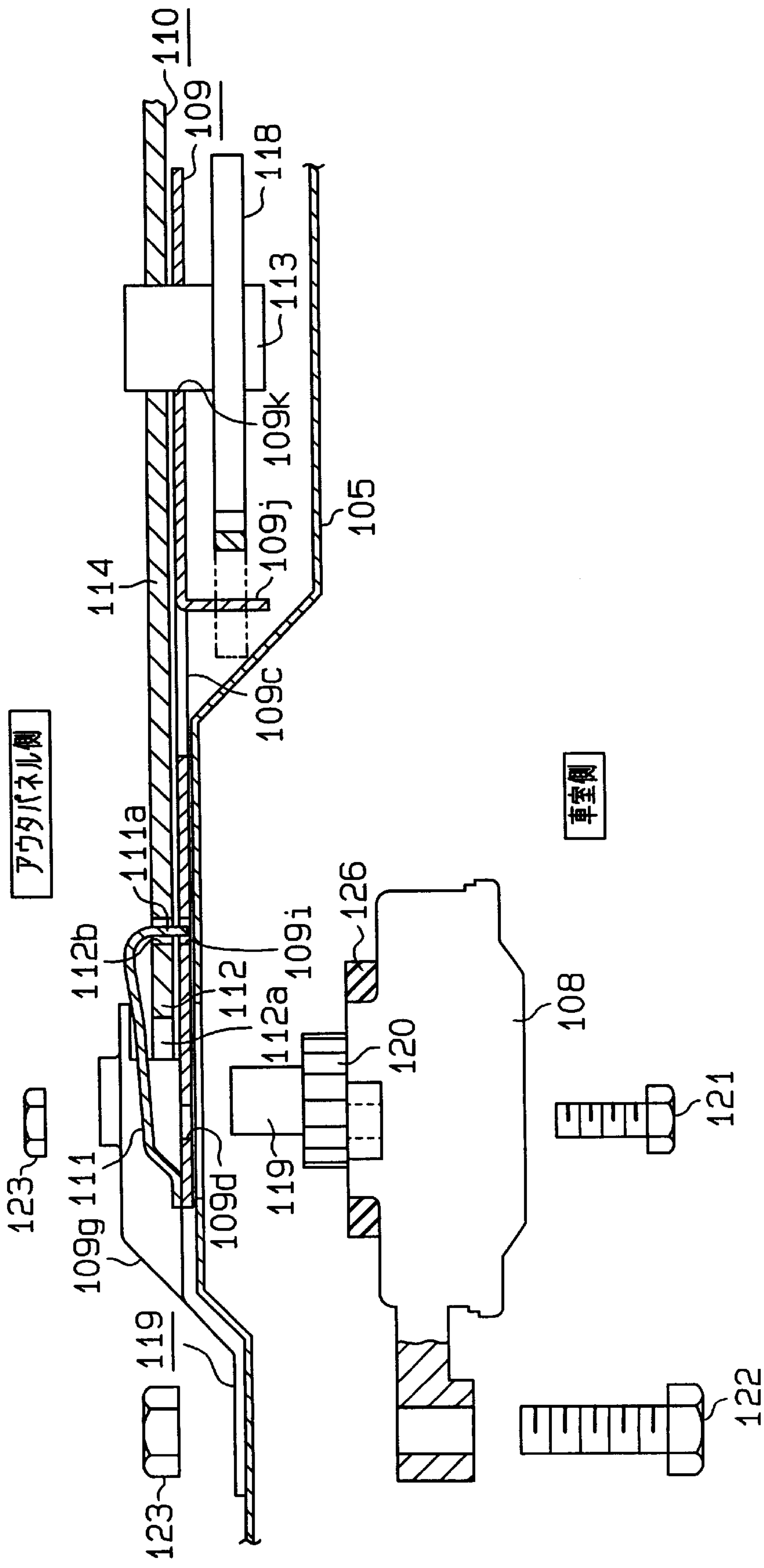
FIG. 13 is a cross-sectional view taken along line 13—13 in FIG. 12.
Figure 14:
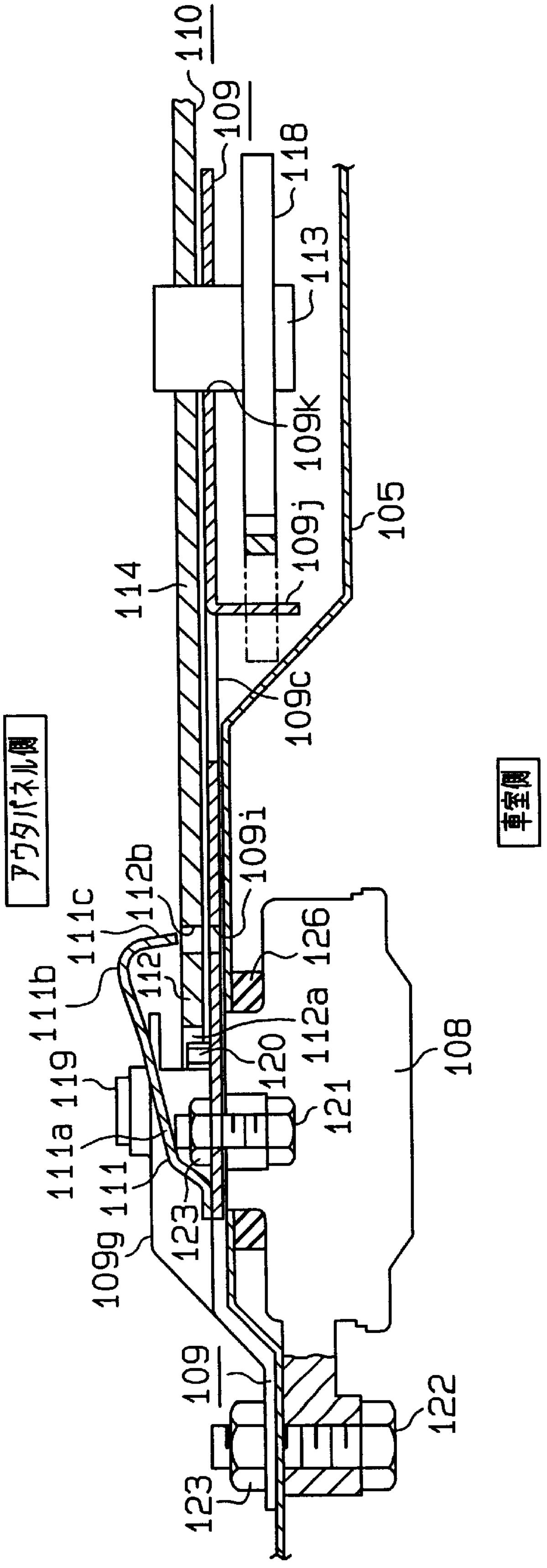
FIG. 14 is a cross-sectional view showing the window regulator with a drive motor fixed thereto.

FIG. 13 is a cross-sectional view taken along line 1313 in FIG. 12. As shown in FIG. 13, the engaging member 111 is a leaf spring having a proximal portion fixed to the left side of the first mounting hole 109*d*, a cover 111*a* covering the first motor mounting hole 109*d*, a bent portion 111*b* bent toward the inner panel 105, and a hook 111*c* extending toward the inner panel 105. The cover 111*a* is separated from the first motor mounting hole 109*d* by a predetermined distance. The hook 111*c* extends to a location where the hook 111*c* engages the first engaging bore 109*i* of the base 109.

When the first engaging bore 109*i* is aligned with any one of the second engaging bores 112*b*, the hook 111*c* engages the first and second engaging bores 109*i*, 112*b*. Accordingly, the hook 111*c* restricts relative pivoting between the first arm 114 and the base 109.

The drive motor 108 is fixed to the inner panel 105 from the passenger compartment side and connected to the base 109 by way of the inner panel 105. More specifically, as shown in FIG. 14, first and second bolts 121, 122 are inserted into the first to third mounting bores 109*d*–109*f* from the drive motor 108 and fastened by nuts 123. In this state, the bolt 121 forces the cover 111*a* of the engaging member 111 toward the outer panel 104. This disengages the hook 111*c* from the first and second engaging bores 109*i*, 112*b* and permits relative pivoting between the first arm 114 and the base 109. In other words, relative pivoting between the first arm 114 and the base 109 is restricted until the motor 108 is secured. As a result, installation of the window regulator 106 is facilitated.

Since the engaging member 111 is a leaf spring, removal of the first bolt 121 engages the hook 111*c* with the first and second engaging bores 109*i*, 112*b*. Accordingly, pivoting of the base 109 relative to the first arm 114 is restricted again. This facilitates re-installation of the window regulator 106.

Figure 15:
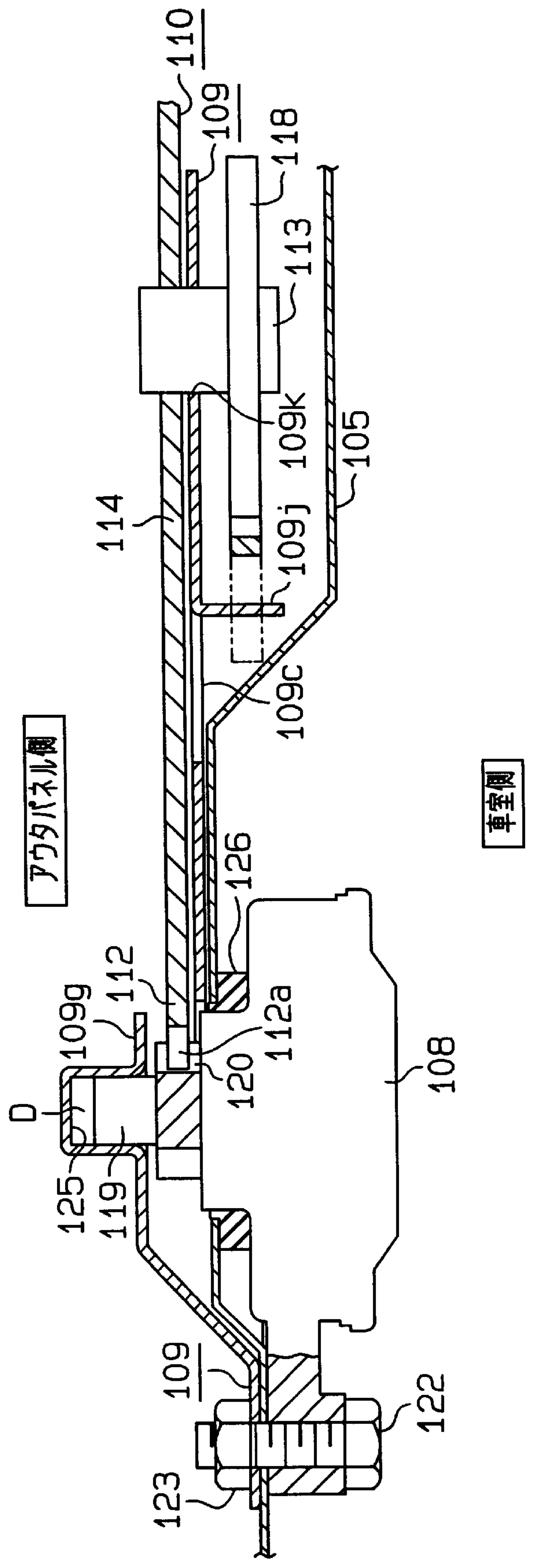
FIG. 15 is a cross-sectional view showing a window regulator according to a seventh embodiment of the present invention.
Figure 16:
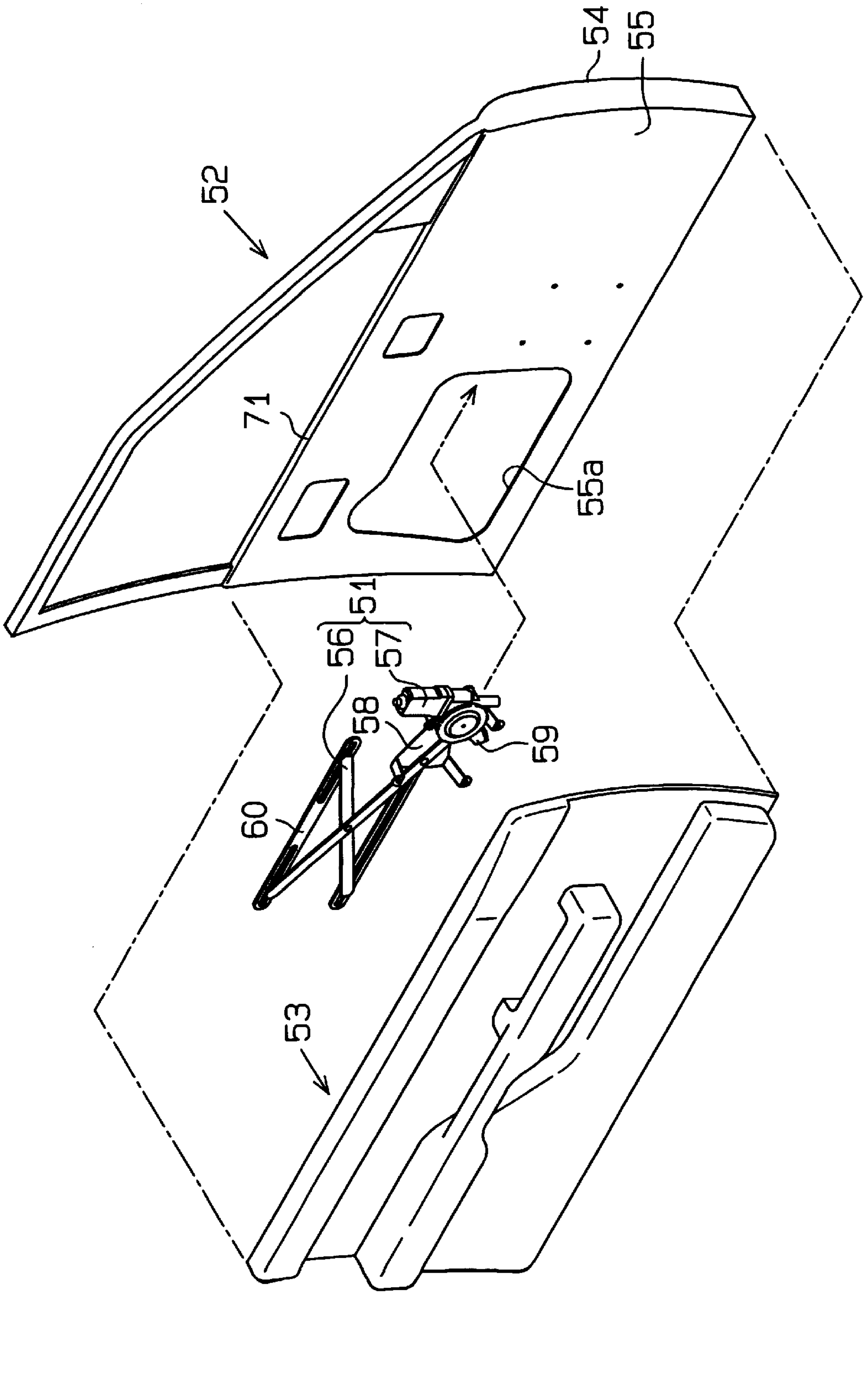
Fig.16(Prior Art)
FIG. 16 is a perspective view showing a vehicle door incorporating a prior art power window apparatus.
Figure 17:
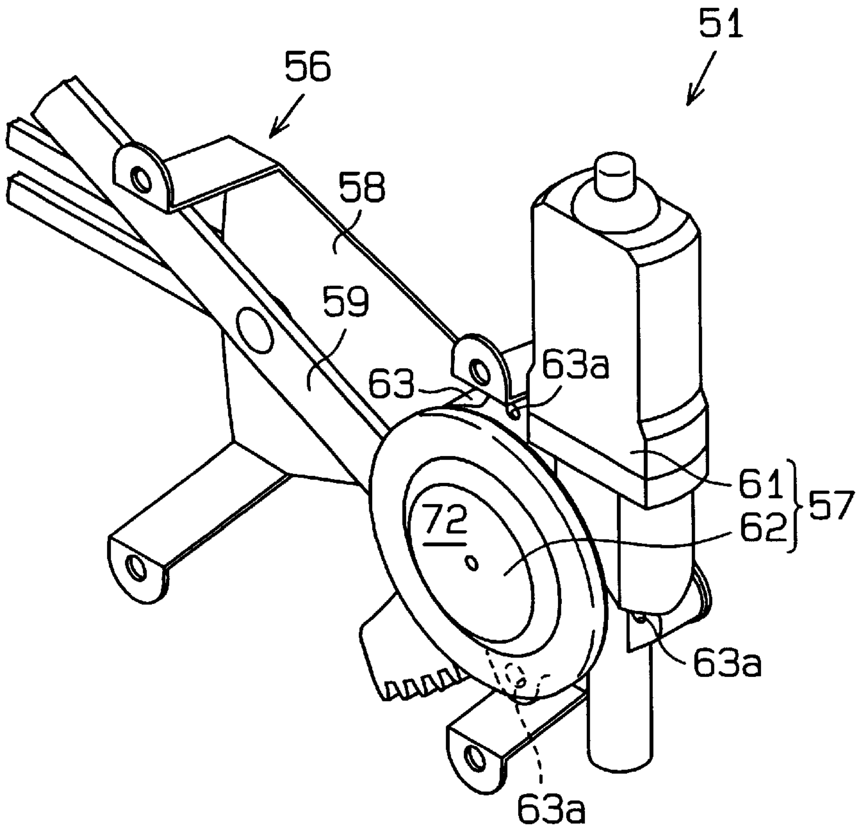
Fig.17 (Prior Art)
FIG. 17 is a perspective view showing the power window apparatus of FIG. 16.
Figure 18:
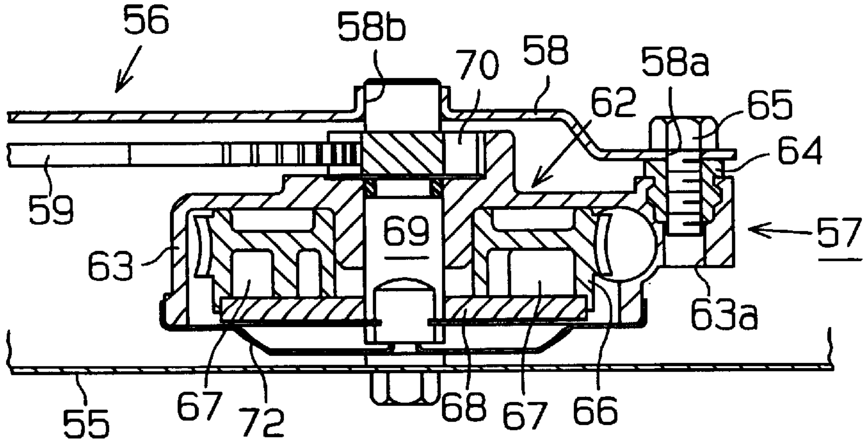
Fig.18 (Prior Art)
FIG. 18 is a cross-sectional view showing the mounting structure of the prior art power window apparatus.
Figure 19:
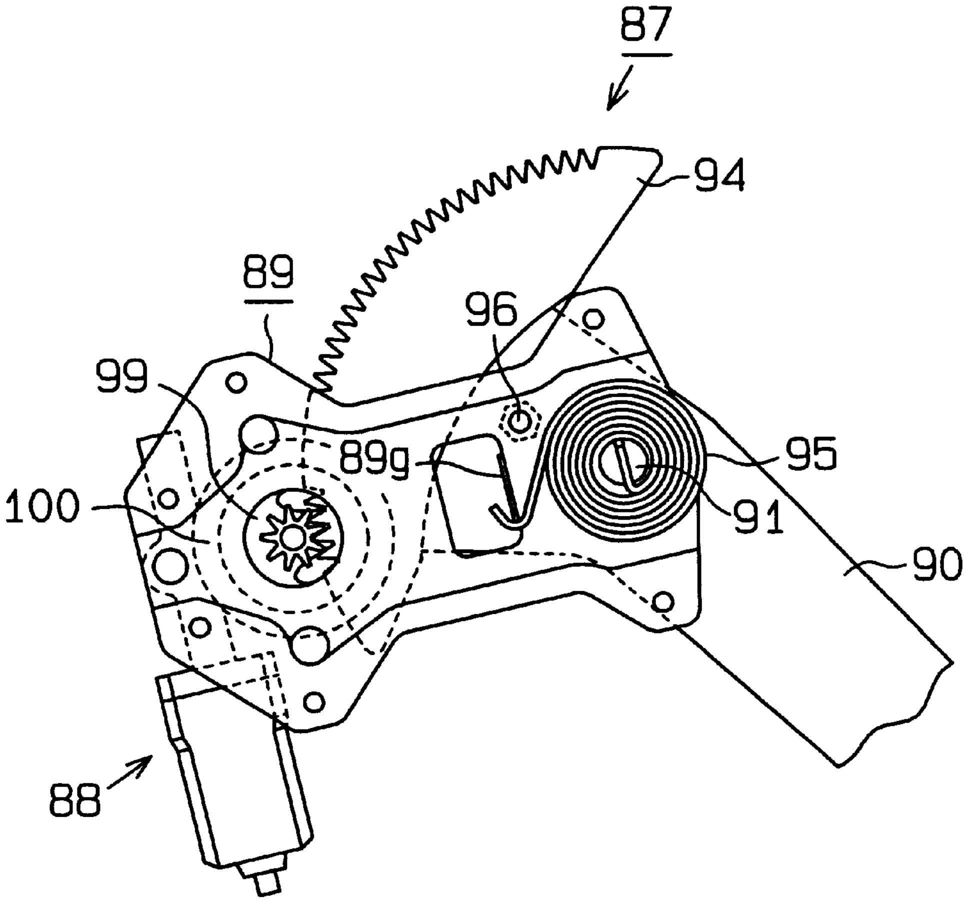
Fig.19 (Prior Art)
FIG. 19 is a front view showing a prior art window regulator.

As shown in FIG. 15, in the sixth embodiment, a cover 125, which covers the drive shaft 119 may be employed in lieu of the drive shaft hole 109*h*. In such case, the grease applied to the distal end of the drive shaft 119 is sealed in the space D of the cover 125. Thus, the grease does not adhere to other components.

The above embodiments may be modified as described below.

In the first to fourth embodiments, the position of the regulator 6 and the motor 7 may be changed arbitrarily as long as the motor 7 is protected from rainwater by the elastic member 21 or the rubber partitions 23, 24. For example, at least the movable arm 10 of the regulator 6 may be arranged in the space between the outer panel 4 and the inner panel 5. Furthermore, the entire motor 7 may be arranged in the passenger compartment side of the inner panel 5 if the movable arm 10 of the regulator 6 can be driven through the through bore 5*c*.

In the first to third embodiments, the elastic member 21 and the rubber partitions 23, 24 may be fixed to the inner panel 5 instead of the housing 14 of the motor 7. Alternatively, the elastic member 21 and the rubber partitions 23, 24 may be held between the inner panel 5 and the motor 7.

In the first to fourth embodiments, the regulator 6 and the motor 7 may be fastened to the inner panel 5 in any arbitrary manner.

In the first to fourth embodiments, the recessed portion 5*a* of the inner panel 5 may be eliminated.

In the fifth and sixth embodiments, the first engaging bore 109*i* may be replaced by a recess or an engaging plate as long as the engaging member 111 engages the hook 111*c*.

In the fifth and sixth embodiments, the first engaging bore 109*i* may be eliminated. In such case, engaging plates for engaging the hook 111*c* may be formed on the sector gear 112 in lieu of the second engaging bore 112*b*.

In the fifth and sixth embodiments, a leaf spring is employed as the engaging member 111. However, the engaging plate 111 may be formed from a material that can be deformed in a manner other than elastic deformation to engage or disengage the second engaging bore 112*b*.

In the sixth embodiment, the engaging member 111 may be arranged at a position corresponding to the bolts 122 inserted through the second and third motor mounting holes 109*e*, 109*f* instead of at a position corresponding to the first motor mounting hole 109*d*. Alternatively, the engaging member 111 may be arranged at a position corresponding to the bolt inserted through the mounting hole 109*b*, which is provided on the rim portion 109*a* of the base 109.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A power window apparatus arranged in a vehicle door, comprising:

a base attached to an inner panel of the door;

a drive motor attached to the base by means of the inner panel, the drive motor having a drive shaft;

a regulator, wherein the regulator includes an arm having a sector gear, which is meshed with the drive shaft of the drive motor, wherein the arm is supported relatively pivotal to the base;

an urging member for urging the arm in a single direction relative to the base, wherein the urging member is arranged at the connecting portion between the base and the arm; and an engaging member for restricting pivoting of the arm relative to the base by engaging the base and the arm, wherein a part of the drive motor releases the engagement between the base and the arm, which is caused by the engaging member, when the drive motor is attached to the base.

2. The power window apparatus according to claim 1, wherein the engaging member is formed by a leaf spring, a proximal portion of which is fixed to the base and a distal end of which defines an engaging hook, and wherein the sector gear has an engaging bore engaged by the engaging hook.

3. The power window apparatus according to claim 1, wherein the sector gear has a plurality of engaging bores that are located along an arc extending about a pivoting center of the arm.

4. The power window apparatus according to claim 1, wherein the drive motor is secured by a bolt, and wherein the part of the drive motor includes at least one of the drive shaft of the drive motor and the bolt, and wherein the one of the drive shaft and the bolt presses the engaging member.

5. The power window apparatus according to claim 1, wherein the arm is arranged in a space formed between the inner panel and an outer panel of the door, wherein the inner panel has a through bore, and the drive shaft extends through the through bore and is located in the space, and wherein a seal member is arranged between the motor and the inner panel to close the through bore.

6. The power window apparatus according to claim 5, wherein the seal member is held between the inner panel and the motor when the motor is fixed to the inner panel.

7. The power window apparatus according to claim 6, wherein the seal member is an elastic member.

8. The power window apparatus according to claim 7, wherein the elastic member is an independent foam body.

9. The power window apparatus according to claim 7, wherein the elastic member is formed from rubber.

10. The power window apparatus according to claim 5, wherein the seal member surrounds the drive shaft.

11. The power window apparatus according to claim 5, wherein the seal member is deformed by the inner panel and the motor when the motor is fixed to the panel.

* * * * *